United States Patent
Oh et al.

(10) Patent No.: US 9,521,605 B2
(45) Date of Patent: Dec. 13, 2016

(54) METHOD AND APPARATUS FOR HANDOVER

(71) Applicant: ELECTRONICS AND TELECOMMUNICATIONS RESEARCH INSTITUTE, Daejeon (KR)

(72) Inventors: Sung-Min Oh, Daejeon (KR); Sook-Yang Kang, Daejeon (KR); Hyun-Seo Park, Daejeon (KR); Ae-Soon Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 20 days.

(21) Appl. No.: 14/737,245

(22) Filed: Jun. 11, 2015

(65) Prior Publication Data
US 2016/0007261 A1    Jan. 7, 2016

(30) Foreign Application Priority Data
Jul. 1, 2014    (KR) ........................ 10-2014-0082113

(51) Int. Cl.
*H04W 36/00* (2009.01)
*H04W 36/30* (2009.01)
(Continued)

(52) U.S. Cl.
CPC ............. *H04W 36/30* (2013.01); *H04B 7/022* (2013.01); *H04B 7/0408* (2013.01); *H04W 36/06* (2013.01); *H04W 72/1231* (2013.01)

(58) Field of Classification Search
USPC .................................................. 455/436–448
See application file for complete search history.

(56) References Cited

U.S. PATENT DOCUMENTS

2005/0070285 A1*  3/2005  Goransson ............ H04W 36/30
                                                             455/436
2009/0111473 A1     4/2009  Tao et al.
(Continued)

FOREIGN PATENT DOCUMENTS

JP      2010-525619 A    7/2010
KR   10-2013-0034827 A    4/2013

OTHER PUBLICATIONS

Sung-Min Oh et al., "An Efficient Handover Scheme for Providing the Inter-beam Mobility", ICTC 2014, Oct. 22, 2014, P-1.51.
(Continued)

*Primary Examiner* — Joel Ajayi
(74) *Attorney, Agent, or Firm* — Rabin & Berdo, P.C.

(57) ABSTRACT

A method and apparatus for handover is provided. In a network environment in which a plurality of beams are provided within a base station, a terminal measures signal strength of a serving beam and signal strength of a target beam and transmits a measurement report message when a first condition or a second condition is satisfied. The base station determines inter-beam coordinated scheduling when the signal strength of the serving beam and target beam satisfy the first condition, and determines handover between beams when the signal strength of the serving beam and target beam satisfy the second condition. The base station transmits a message for commanding handover to the terminal when the handover between beams is determined. The terminal then stops communicating with the serving beam and performs handover to the target beam.

9 Claims, 7 Drawing Sheets

(51) Int. Cl.
*H04B 7/02* (2006.01)
*H04B 7/04* (2006.01)
*H04W 72/12* (2009.01)
*H04W 36/06* (2009.01)

(56) References Cited

U.S. PATENT DOCUMENTS

| | | |
|---|---|---|
| 2012/0276946 A1 | 11/2012 | Sung et al. |
| 2013/0083774 A1 | 4/2013 | Son et al. |
| 2014/0073329 A1* | 3/2014 | Kang .................... H04W 36/30 455/439 |

OTHER PUBLICATIONS

Sung-Min Oh et al., "An Enhanced Handover Scheme to Provide the Robust and Efficient Inter-beam Mobility", IEEE Communications Letters, vol. 19, No. 5, May 2015 [Online Published: Feb. 9, 2015].

* cited by examiner

METHOD AND APPARATUS FOR HANDOVER

CROSS-REFERENCE TO RELATED APPLICATION

This application claims priority to and the benefit of Korean Patent Application No. 10-2014-0082113 filed in the Korean Intellectual Property Office on Jul. 1, 2014, the entire contents of which are incorporated herein by reference.

BACKGROUND OF THE INVENTION (a) Field of the Invention

The present invention relates to handover. More particularly, the present invention relates to a method and apparatus for performing handover between beams in a mobile communication system.

(b) Description of the Related Art

With the advent of communication devices such as a smart phone, user traffic has increased, that is, data capacity has exponentially increased, and thus a need for providing high data throughput per user is constantly increases. As a result, a high bandwidth using high frequency is required.

Recently, near field wireless transmission that provides a high data rate in the 30-300 GHz band, called a millimeter wave band (mmWave), has been researched. The millimeter wave band has a unique attribute of such a high frequency. It has a merit of supporting a wireless application that requires a high transmission rate of gigabytes as well as a drawback of a seriously short propagation distance as compared to other frequency bands.

It is capable of more precise beam forming in a mmWave band, unlike a cellular band. To support coverage of a wide range with a base station, a plurality of precise beams can be formed sequentially. Also, to increase network capacity, a unique physical beam identifier is allocated to each beam of a cell so that the beams can be operated like a cell. Accordingly, when a terminal moves between beams, the inter-base station handover method of a cellular system may be applied.

However, when the inter-base station handover method of a cellular system is applied to a mobile communication system in a multi-beam environment, signaling overhead increases by transmitting/receiving messages between base stations.

Also, a signal to interference noise ratio (SINR) is rapidly degraded in the overlapping area between beams in an environment in which a plurality of beams are formed sequentially, and thereby handover performance degradation occurs.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and apparatus for efficiently performing handover when a terminal moves between beams in a network environment in which a plurality of beams are sequentially formed.

An exemplary embodiment of the present invention provides a method for handover to perform handover between beams by a terminal in a network environment in which a plurality of beams are provided within a base station. The method includes: measuring, by a terminal, signal strength of a serving beam and signal strength of a target beam; transmitting, by a terminal, a first measurement report message to the base station when the signal strength of the serving beam and the signal strength of the target beam satisfy a first condition; transmitting, by a terminal, a second measurement report message to the base station when the signal strength of the serving beam and the signal strength of the target beam satisfy a second condition; performing, by a terminal, switching from the serving beam to the target beam when receiving a message commanding handover from the base station; and informing the base station of handover completion after performing the switching.

The first condition may represent that the signal strength of the serving beam is greater than the signal strength of the target beam by a first offset.

The second condition may represent that the signal strength of the target beam is maintained greater than the signal strength of the serving beam by a second offset during a predetermined time.

The message of commanding handover may include an identifier of the target beam and uplink resource allocation information on the target beam.

The informing of handover completion may include transmitting a handover completion message to the base station through an uplink resource corresponding to the uplink resource allocation information included in the message commanding handover.

The method may further include performing inter-beam coordinated scheduling (IBCS) in which transmitting/receiving data through the serving beam and the target beam is performed when the first condition is satisfied.

The transmitting of the second measurement report message may occur when the second condition is satisfied in a state in which the IBCS is performed. Another embodiment of the present invention provides a method for handover in a network environment in which a plurality of beams are provided within a base station. The method includes: receiving, by a base station, a first measurement report message including information on target beams that satisfy a first condition from a terminal; allowing, by the base station, inter-beam coordinated scheduling (IBCS) in which transmitting/receiving data through a serving beam and a target beam is performed; receiving, by a base station, a second measurement report message representing that the target beam for the IBCS satisfies a second condition from a terminal; and transmitting, by the base station, a message for commanding handover to the target beam for the IBCS to the terminal when the second condition is satisfied.

The first condition may represent that the signal strength of the serving beam is greater than the signal strength of the target beam by a first offset, and the second condition may represent that the signal strength of the target beam is maintained greater than the signal strength of the serving beam by a second offset during a predetermined time.

The allowing the IBCS includes: designating target beams in which a difference between the reference signal received power (RSRP) of the serving beam and its RSRP is less than a first offset as candidate beams for the IBCS; determining whether to accept an amount of resources required by the terminal based on a remaining amount of resources minus average resource usage from a total amount of resources for each of the candidate beams; and approving a candidate beam as a target beam for the IBCS if it is possible to accept the candidate beam.

The method may further include allocating resources for a physical downlink shared channel (PDSCH) and a physical downlink control channel (PDCCH) of the serving beam and the target beam in the same position.

The message for commanding handover may include an identifier of the target beam and uplink resource allocation information on the target beam.

The method may further include receiving a message for representing handover completion of the terminal through an uplink resource corresponding to the uplink resource allocation information.

Yet another embodiment of the present invention provides an apparatus for handover to perform handover between beams by a terminal in a network environment in which a plurality of beams are provided within a base station. The apparatus includes: a signal strength measuring processer for measuring signal strength of a serving beam and signal strength of a target beam; a measurement report message transmission determining processer for generating a first measurement report message and transmitting it to the base station when the signal strength of the serving beam and the signal strength of the target beam satisfy a first condition or a second condition; a handover command receiver for receiving a message commanding handover from the base station; and a handover performing processer for performing handover from the serving beam to a target beam corresponding to an identifier of a target beam included in the message commanding handover.

The measurement report message transmission processer may generate and transmit a second measurement report message if the second condition is satisfied in a state in which inter-beam coordinated scheduling (IBCS) of transmitting/receiving data through a serving beam and a target beam is performed after transmitting a first measurement report message when the first condition is satisfied.

The apparatus may further include a handover informing processer for transmitting a handover completion message to the base station through an uplink resource corresponding to the uplink resource allocation information included in the message commanding handover.

The handover informing processer may transmit the handover completion message if the identifier of the target beam is provided from the handover performing processer.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the present specification, unless explicitly described to the contrary, the word "comprise" and variations such as "comprises" or "comprising" will be understood to imply the inclusion of stated elements but not the exclusion of any other elements.

In this specification, a terminal may designate a mobile terminal (MT), a mobile station (MS), an advanced mobile station (AMS), a high reliability mobile station (HR-MS), a subscriber station (SS), a portable subscriber station (PSS), an access terminal (AT), user equipment (UE), etc., and may include the entire or partial functions of the MT, the MS, the AMS, the HR-MS, the SS, the PSS, the AT, the UE, etc.

A base station (BS) may designate an advanced base station (ABS), a high reliability base station (HR-BS), a node B (nodeB), an evolved node B (eNodeB), an access point (AP), a radio access station (RAS), a base transceiver station (BTS), a mobile multihop relay (MMR)-BS, a relay station (RS) serving as a base station, a relay node (RN) serving as a base station, an advanced relay station (HR-RS) serving as a base station, a high reliability relay station (HR-RS) serving as a base station, a small base station (a femto BS, a home node B (HNB), a home eNodeB (HeNB), a pico BS, a metro BS, a micro BS, etc.), etc., and may include all or some functions of the ABS, the nodeB, the eNodeB, the AP, the RAS, the BTS, the MMR-BS, the RS, the RN, the ARS, the HR-RS, the small base station, etc.

Hereinafter, a method and apparatus for handover according to an exemplary embodiment of the present invention will be described.

Figure 1:
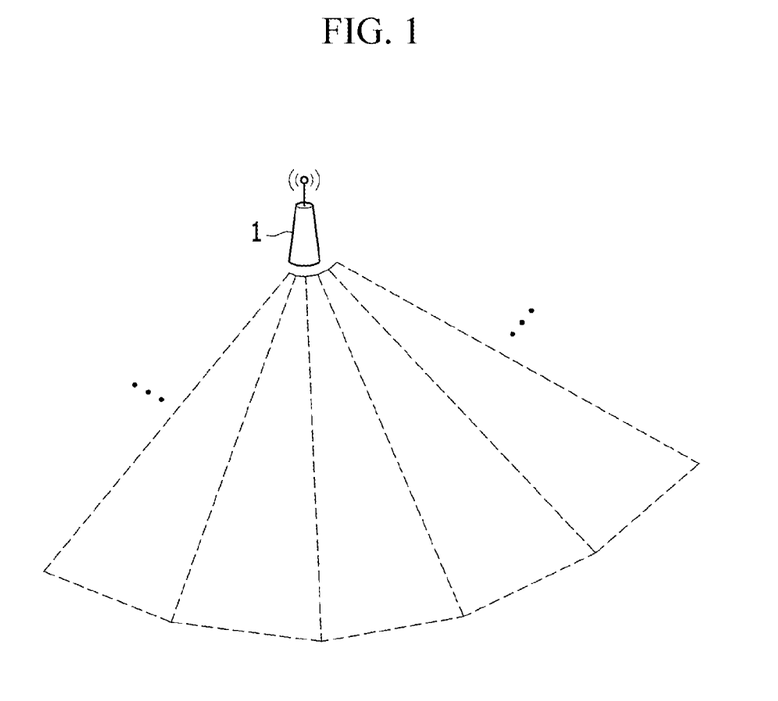
FIG. 1 shows a network environment in which handover is performed according to an exemplary embodiment of the present invention.

FIG. 1 shows a network environment in which handover is performed according to an exemplary embodiment of the present invention.

As shown in FIG. 1, a base station 1 sequentially forms a plurality of precise beams to support coverage of a wide range. The base station 1 allocates a physical beam identifier (ID) to each of beams that are sequentially formed to run them as a cell. A terminal may receive data through a plurality of beams transmitted from the base station 1, and transmit data by interchanging downlink transmission beams of the base station 1.

When the terminal 2 moves between beams to receive data, handover may be performed.

Figure 2:
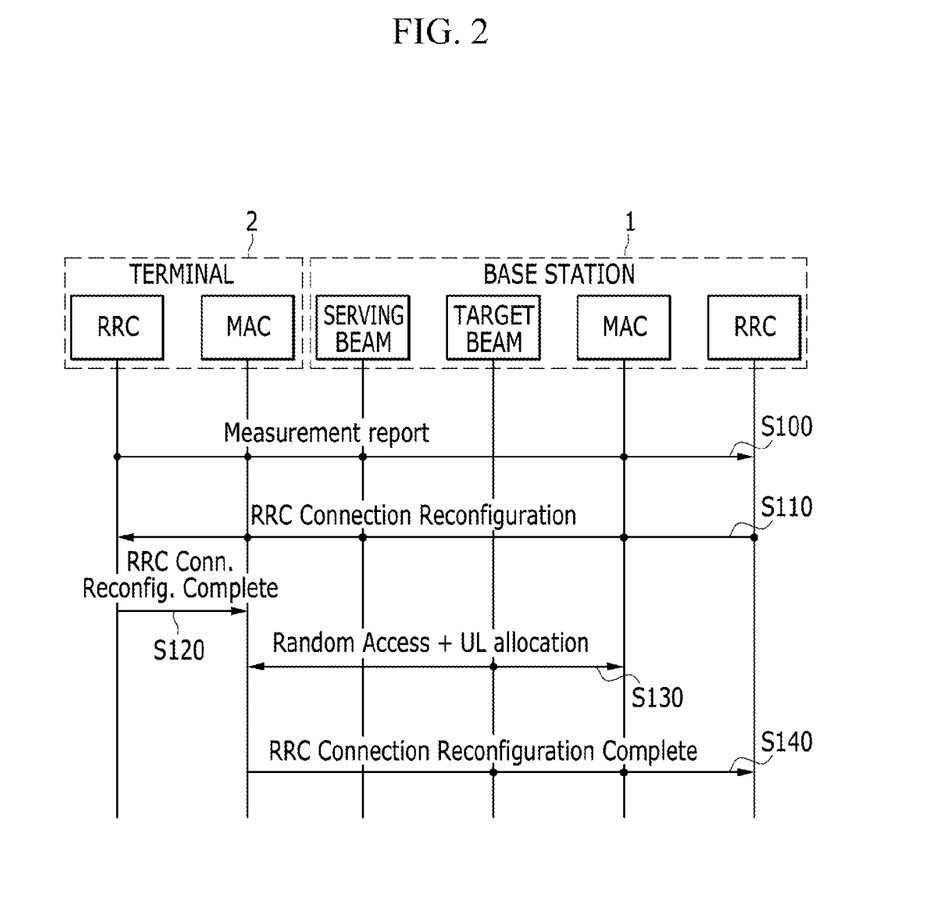
FIG. 2 shows a process of handover between beams based on the general handover method.

If a general handover method is applied to handover between beams, a handover process as in FIG. 2 is performed.

FIG. 2 shows a process of handover between beams based on the general handover method.

In an environment in which a plurality of beams are formed sequentially, the terminal 2 transmits channel status information on a serving beam and neighboring beams through a measurement report message to the base station 1 (S100). The base station 1 determines whether to perform handover based on the channel status information of the measurement report message and determines a target beam for handover. Then, the base station 1 transmits a radio resource control (RRC) connection reconfiguration message including an identifier of the target beam to the terminal 2 (S110). The terminal 2 attempts to access the target beam (S120 and S130), and receives uplink resource allocation and timing rearrangement information from the base station 1. Then, the terminal 2 transmits an RRC connection reconfiguration completion message through an allocated uplink resource to the base station 1 (S140).

As stated above, the terminal 2 transmits/receives RRC messages according to the general handover method when performing handover between beams. However, when the terminal moves at a high speed between beams in the vicinity of the base station, the occurrence frequency of handover between beams may sharply increase, and thereby signaling overhead may increase. Particularly, since the size of the RRC messages is greater than that of control messages that are transmitted/received in the lower layers, a signaling overhead rate becomes high. Also, the RRC message operates in an acknowledgement mode at a radio link control (RLC) layer to improve the transmission success rate in a radio channel. This means that the RRC message may be segmented at the RLC layer, and an RLC header is added to each of segmented RLC service data units (SDU). Accordingly, the size of medium access control (MAC) protocol data units (PDU) transmitted in a radio channel may increase.

Figure 3:
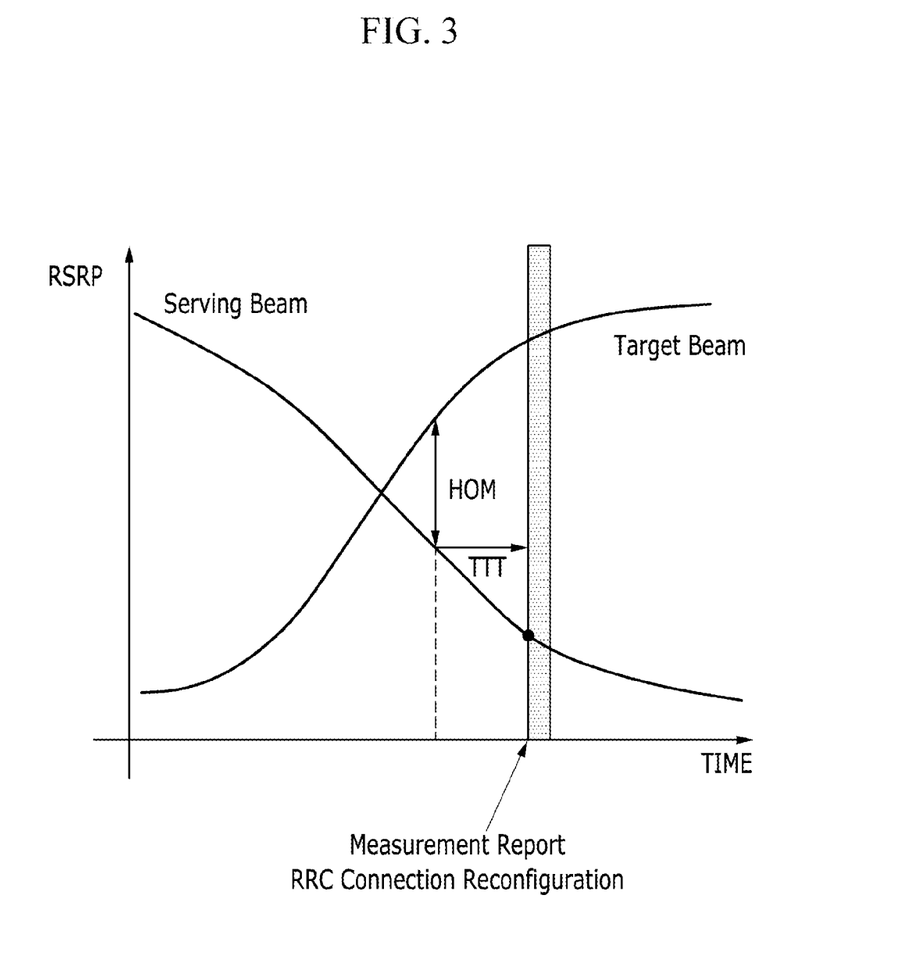
FIG. 3 shows general handover event triggering conditions.

General handover event triggering conditions are represented as in FIG. 3.

FIG. 3 shows general handover event triggering conditions.

A terminal can measure received signal strength, that is, reference signal received power (RSRP) of a serving beam and a target beam, according the handover event triggering conditions. In this case, if the signal strength of the target is maintained to be greater than that of the serving beam by an offset (which may referred to as a handover margin (HOM)) during a predetermined time (e.g., a time to trigger (TTT)), the terminal determines that a handover event occurs and then transmits a measurement report message including channel status information to a base station to perform handover.

However, in a network environment in which a plurality of beams are formed sequentially, a signal to interference noise ratio (SINR) may be sharply deteriorated in an overlapping area between beams. Accordingly, the SINR is sharply deteriorated at the time of transmitting an RRC connection reconfiguration message, and thereby handover failure rate may increase.

When the value of HOM is set to be small and the value of TTT is set to be small to reduce the handover failure rate, although terminals near a base station move slightly within beams of a narrow width, a ping-pong phenomenon may occur.

Therefore, a plan for improving SINR in an overlapping area between beams is required. The overlapping area between beams may be referred to as a beam overlapping area. If the SINR improves in the beam overlapping area, the transmission success rate of the handover message improves, which causes setting of the value of HOM to be larger and setting the value of TTT to be longer. Accordingly, ping-pong phenomenon occurrence rate may be reduced.

Handover between beams is performed based on the following according to an exemplary embodiment of the present invention.

(1) Handover between beams is performed by using a MAC control element (CE) to reduce signaling overhead.

(2) Resources of the same position between target beams are allocated simultaneously to a terminal through inter-beam coordinated scheduling (IBCS) to improve SINR at the beam overlapping area so that handover performance improves. At this time, resources regarding a physical downlink shared channel (PDSCH) for data transmission as well as a physical downlink control channel (PDCCH) for resource allocation information are allocated in the same position between beams.

Figure 4:
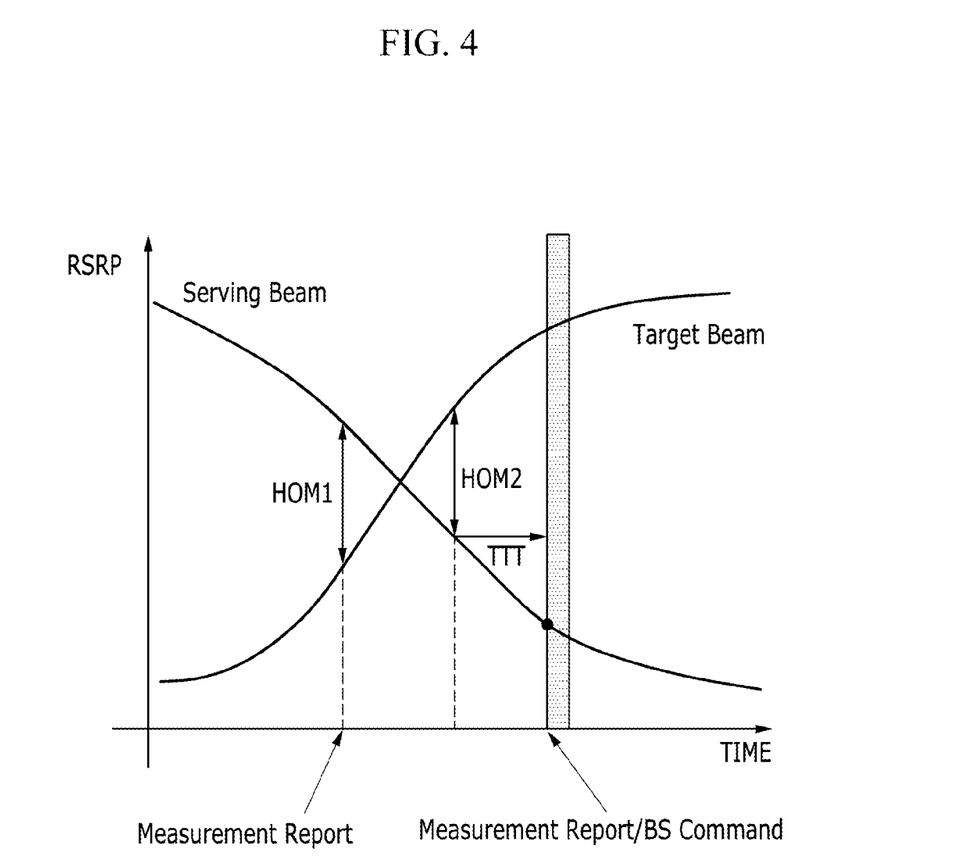
FIG. 4 shows handover event triggering conditions according to an exemplary embodiment of the present invention.

FIG. 4 shows handover event triggering conditions according to an exemplary embodiment of the present invention.

In an exemplary embodiment of the present invention, a terminal continuously measures the signal strength of a serving beam and the signal strength of a target beam and compares them. When the signal strength of the serving beam is greater than the signal strength of the target beam by a first offset (which will be referred to as HOM1), the terminal transmits a measurement report message to a base station. When determining that the signal strength of the serving beam is greater than the signal strength of the target beam by the HOM1 based on the measurement report message, the base station performs resource allocation and data transmission through inter-beam coordinated scheduling (IBCS).

After this, when the signal strength of the target beam is maintained greater than the signal strength of the serving beam by the second offset (which will be referred to as HOM2) during a predetermined time (e.g. TTT) because the terminal continues to move to the target beam, the terminal transmits a measurement report message to the base station. The base station determines handover to the target beam according to the measurement report message and transmits a beam switching command message to the terminal. Upon receiving the beam switching command message, the terminal cuts off its communication connection with the serving beam, performs a connection to the target beam, and transmits a beam switching completion message to the base station.

Meanwhile, the base station determines whether to allow the IBCS for the terminal based on resource allocation status for target beams according to the content of the measurement report message. When it is determined to allow the IBCS, the base station allocates resources to the terminal, and particularly, allocates resources at the same position for target beams.

Figure 5:
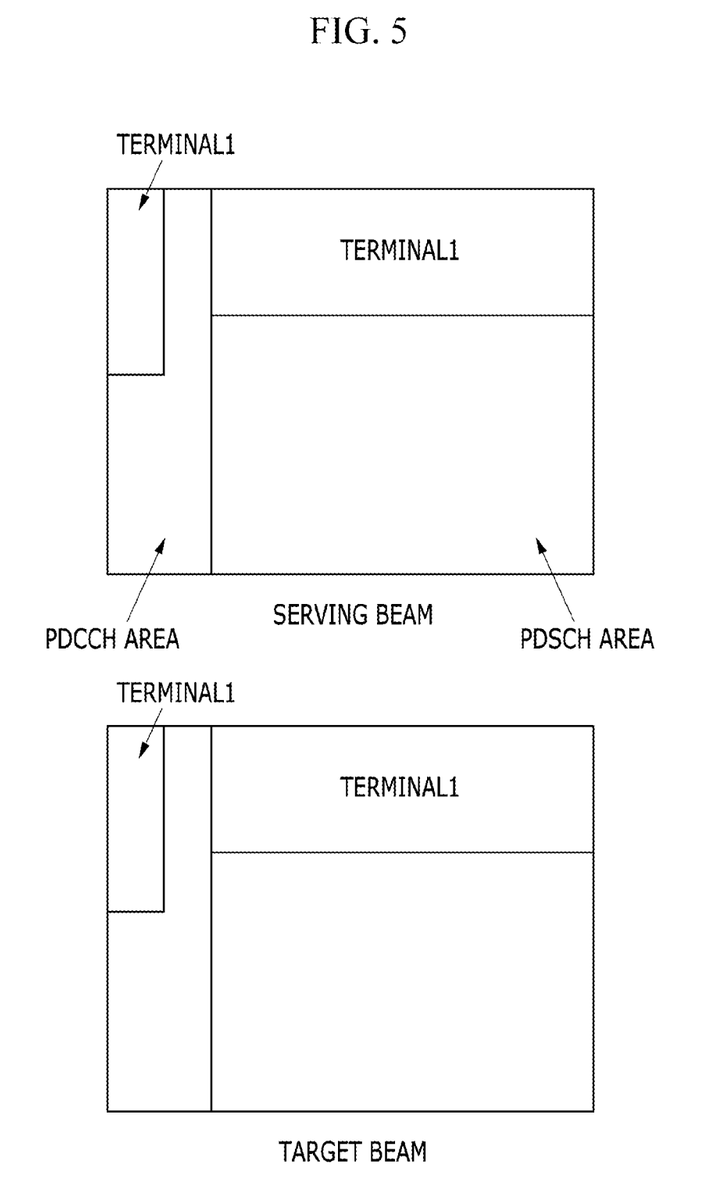
FIG. 5 shows resource allocation for inter-beam cooperative scheduling according to an exemplary embodiment of the present invention.

FIG. 5 shows resource allocation for IBCS according to an exemplary embodiment of the present invention.

A base station allocates resources in the same position to the PDCCH and PDSCH of beams as in FIG. 5, when the IBCS for a target beam is allowed. That is, resources for the PDCCH and PDSCH of a target beam are allocated in the same position as the position of resources for them of a serving beam.

Meanwhile, for the IBCS, the terminal 1 may decode a signal with an identifier of the serving beam when generating the signal for the resources allocated to the terminal. Accordingly, the signal strength of the target beam that has acted as interference is added to the signal strength of the serving beam, and thereby the SINR can be improved in the beam overlapping area.

A method for handover between beams according to an exemplary embodiment of the present invention will be described in detail based on the above.

Figure 6:
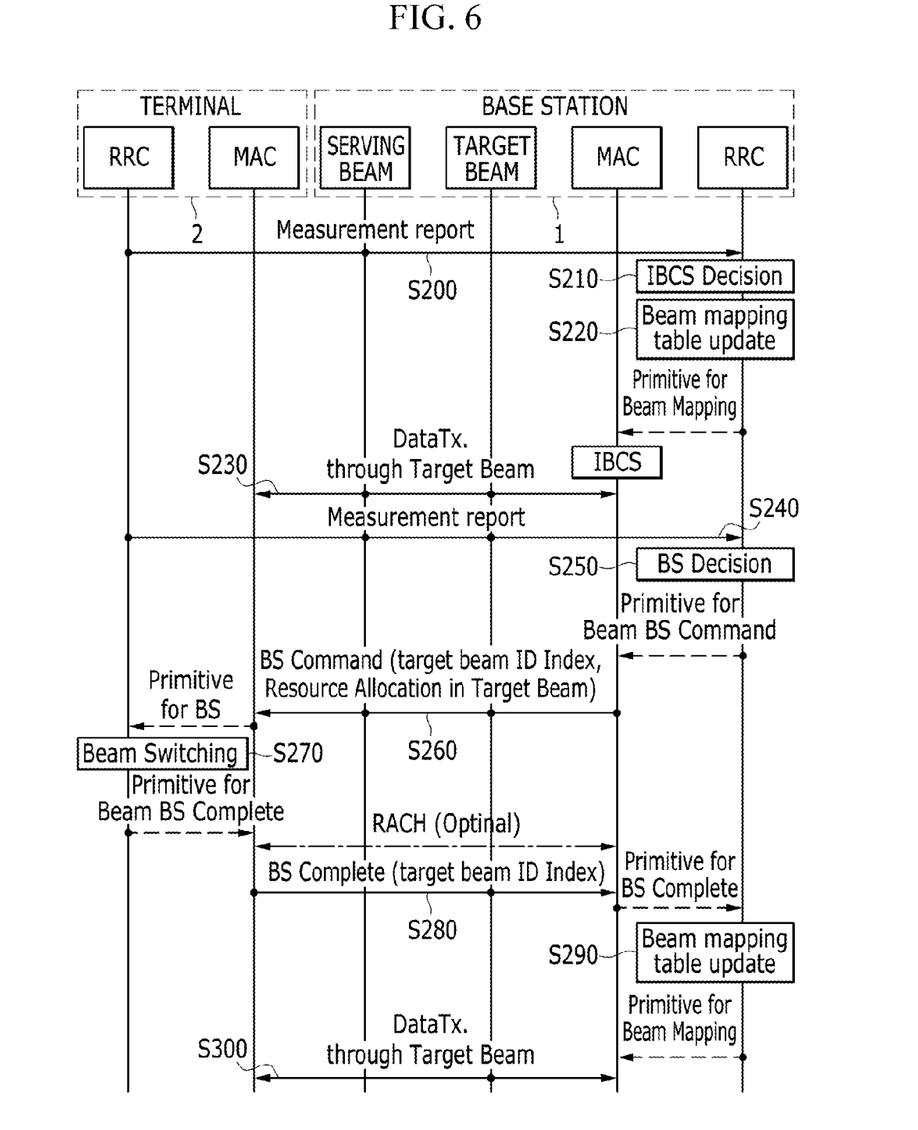
FIG. 6 shows a flowchart of a method for handover between beams according to an exemplary embodiment of the present invention.

FIG. 6 shows a flowchart of a method for handover between beams according to an exemplary embodiment of the present invention.

In an environment in which a plurality of beams are provided by a base station 1, a terminal 2 measures the signal strength of a serving beam and the signal strength of target beams. For example, when the base station 1 transmits/receives data through the serving beam, terminal 2 measures the signal strength of the serving beam and the signal strength of the target beams. The target beams are beams other than the serving beam among the plurality of beams provided by the base station 1, and then they may be beams having signal strength of greater than a predetermined strength.

The terminal 2 compares the signal strength of the serving beam and the signal strength of the target beams to determine whether the handover event triggering conditions are satisfied. When the signal strength of the serving beam is greater than the signal strength of the target beams by the first offset (HOM1), the terminal 2 transmits a measurement report message to the base station 1 (S200). The base station 1 determines whether to allow inter-beam cooperative scheduling based the signal strength of the target beams included in the measurement report message according to the IBCS, and performs the IBCS based on the determination result (S210).

The determination of whether to allow the IBCS by the base station 1 is performed as follows. The base station 1 designates neighboring beams of which the difference between the reference signal received power (RSRP) of the serving beam and its RSRP is less than the HOM1 (e.g., $RSRP_{serving\ beam} - RSRP_{neighboring\ beam} < HOM1$), as candidate beams for IBCS. The base station 1 determines whether to accept the amount of resources required by the terminal 2 based on the remaining amount of resources minus the average resource usage from the total amount of resources (i.e., the total amount of resources—the average resource usage>the required amount of resources) for each of the candidate beams. If it is possible to accept a candidate beam, the base station 1 approves the candidate beam as a target beam for IBCS.

After that, the base station 1 performs the IBCS for the terminal with the serving beam and the approved candidate beam, that is, the target beam. That is, resources for the PDCCH and PDSCH of the serving beam are allocated in the same position as the position of resources for the PDCCH and PDSCH of the target beam, as in FIG. 5 (S220). Accordingly, transmitting/receiving data through the target beam and the serving beams to which the IBCS is approved is performed (S230). If the signal strength of the target beam is maintained greater than the signal strength of the serving beam by the second offset (HOM2) during a predetermined time (TTT), the terminal 2 transmits a measurement report message (S240). That is, when the difference between the signal strength of the target beam and the signal strength of the serving beam is greater than the HOM2, a TTT timer is activated. If the signal strength of the target beam is maintained greater than the signal strength of the serving beam by the HOM 2 during a TTT time, the terminal 2 transmits a measurement report message.

The base station 1 determines handover to the target beam for the terminal based on the measurement report message (S250). Then, the base station 1 transmits a beam switching (BS) command message to inform that the terminal 2 should perform handover to the target beam (S260). Here, the BS command message includes the ID of the target beam and the uplink resource allocation information on the target beam.

The terminal 2 stops communicating with the serving beam and performs the handover to the target beam when receiving the BS command message (S270). Then, the terminal 2 transmits a BS completion message through an uplink resource for a target beam corresponding to uplink resource allocation information included in the BS command message to the base station 1 (S280). Here, the BS completion message includes a beam ID of a target beam to be accessed. When receiving the BS completion message from the terminal 2, the base station 1 corrects beam mapping information on the terminal 2 and corrects the ID of the serving beam for the terminal 2 to the ID of the target beam (S290). Thereafter, transmitting/receiving of data is performed through the target beam (S300).

An apparatus for handover will now be described.

Figure 7:
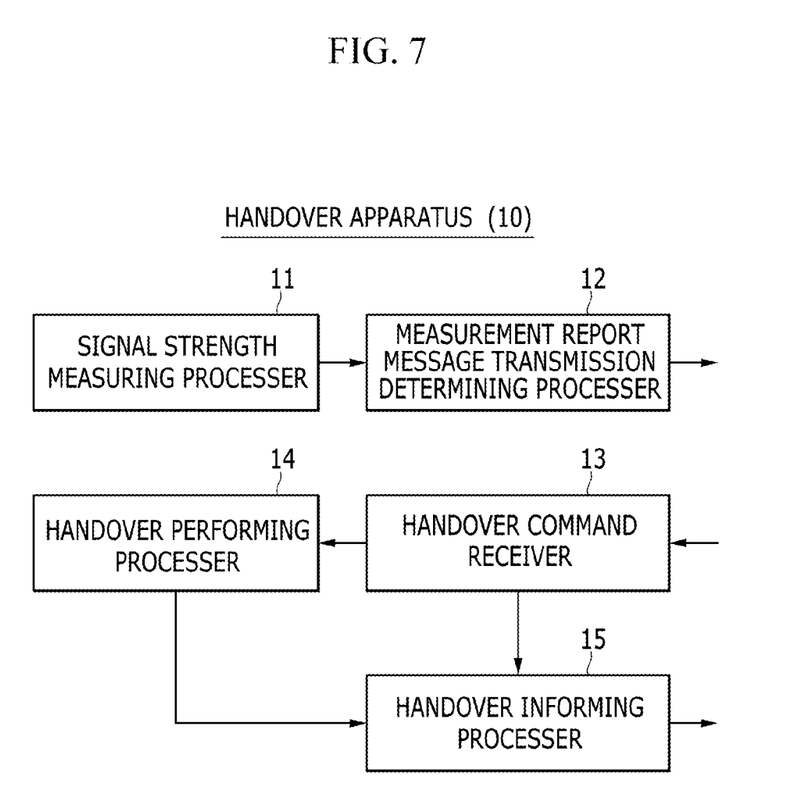
FIG. 7 shows a structure of an apparatus for handover according to an exemplary embodiment of the present invention.

FIG. 7 shows a structure of an apparatus for handover according to an exemplary embodiment of the present invention.

As shown in FIG. 7, an apparatus for handover, that is, a handover apparatus 10 according to an exemplary embodiment of the present invention, includes a signal strength measuring processer 11, a measurement report message transmission determining processer 12, a handover command receiver 13, a handover performing processer 14, and a handover informing processer 15.

The signal strength measuring processer 11 measures the signal strength of a serving beam and the signal strength of neighboring beams, that is, target beams.

The measurement report message transmission determining processer 12 generates a measurement report message when the signal strength of the serving beam and the target beam satisfy predetermined conditions and transmits it to the base station 1. Specifically, the measurement report message transmission determining processer 12 transmits the measurement report message including the signal strength of the serving beam and the target beams to the base station 1 when the first condition in which the difference between the signal strength of the serving beam and the signal strength of the target beam is greater than a first offset and the second condition in which the difference between the signal strength of the serving beam and the signal strength of the target beam is maintained greater than a second offset during a predetermined time are satisfied.

The handover command receiver 13 receives a BS command message from the base station 1, sends the ID of target beam included in the BS command message to the handover performing processer 14, and sends the uplink resource allocation information included in the BS command message to the handover informing processer 15.

The handover performing processer 14 stops communicating with the serving beam when receiving information on BS handover command (e.g., the ID of the target beam), and then switches to the target beam. When it is ready to access the target beam, the handover performing processer 14 sends the ID of the target beam to the handover informing processer 15.

The handover informing processer 15 generates a BS completion message when receiving the ID of the target beam from the handover performing processer 14. Then, the handover informing processer 15 transmits the BS completion message to the base station 1 by using the uplink resource allocation information provided from the handover command receiver 13.

According to an exemplary embodiment of the present invention, when a terminal moves between beams in a network environment in which a plurality of beams are formed sequentially, it is possible to reduce signaling overhead and to minimize the service interruption interval so that handover performance improves. Particularly, handover between beams is performed through a control element (CE) of a medium access control (MAC), and thereby signaling overhead is significantly reduced compared to a prior handover method based on radio resource control (RRC) messages.

Also, as the IBCS is performed in the beam overlapping area, the SINR significantly improves so that a handover failure rate and a ping-pong phenomenon rate decrease.

Additionally, by the IBCS, the SINR of the PDCCH and PDSCH improves in the beam overlapping area, and thereby the throughput improves in the beam overlapping area.

The exemplary embodiments of the present invention may be implemented through the above-described apparatus and/or method, and may also be implemented with a program for realizing the functions corresponding to the elements of the exemplary embodiments of the present invention, and a recording medium storing the program. These implementations may be easily achieved from the description of the exemplary embodiments by a person of ordinary skill in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for handover to perform handover between beams by a terminal in a network environment in which a plurality of beams are provided within a base station, the method comprising:
   measuring, by a terminal, signal strength of a serving beam and signal strength of a target beam;
   transmitting, by a terminal, a first measurement report message to a the base station when the signal strength of the serving beam and the signal strength of the target beam satisfy a first condition;
   performing inter-beam coordinated scheduling (IBCS) to transmit and receive data through the serving beam and the target beam when the first condition is satisfied;
   transmitting, by a terminal, a second measurement report message to the base station when the signal strength of the serving beam and the signal strength of the target beam satisfy a second condition in a state in which the IBCS is performed;
   performing, by a terminal, switching from the serving beam to the target beam when receiving a message commanding handover from the base station; and
   informing the base station of handover completion after performing the handover, wherein
   the first condition represents that the signal strength of the serving beam is greater than the signal strength of the target beam by a first offset; and
   the second condition represents that the signal strength of the target beam is maintained greater than the signal strength of the serving beam by a second offset during a predetermined time.

2. The method of claim 1, wherein the message commanding handover includes an identifier of the target beam and uplink resource allocation information on the target beam.

3. The method of claim 2, wherein the informing of handover completion includes transmitting a handover completion message to the base station through an uplink resource corresponding to the uplink resource allocation information included in the message of commanding handover.

4. A method for handover in a network environment in which a plurality of beams are provided within a base station, the method comprising:
   receiving, by a base station, a first measurement report message including information on a target beam that satisfy a first condition from a terminal;
   allowing, by the base station, inter-beam coordinated scheduling (IBCS) in which transmitting/receiving data through a serving beam and a target beam for the IBCS is performed, including
      designating target beams in which a difference between a reference signal received power (RSRP) the serving beam and a RSRP of each of the target beans is less than a first offset as candidate beams for the IBCS;
      determining whether to accept an amount of resources required by the terminal based on a remaining amount of resources minus average resource usage from a total amount of resources for each of the candidate beams; and
      approving a candidate beam as the target beam for the IBCS when it is possible to accept the candidate beam;
   receiving, by a base station, a second measurement report message representing that the target beam for the IBCS satisfies a second condition from a terminal; and
   transmitting, by the base station, a message for commanding handover to the target beam for the IBCS to the terminal when the second condition is satisfied, wherein
   the first condition represents that the signal strength of the serving beam is greater than the signal strength of the target beam by a first offset, and
   the second condition represents that the signal strength of the target beam is maintained greater than the signal strength of the serving beam by a second offset during a predetermined time.

5. The method of claim 4, comprising
allocating resources for a physical downlink shared channel (PDSCH) and a physical downlink control channel (PDCCH) of the serving beam and the target beam in the same position.

6. The method of claim 4, wherein the message for commanding handover includes an identifier of the target beam and uplink resource allocation information on the target beam,
   wherein the method further comprises
   receiving a message for representing handover completion of the terminal through an uplink resource corresponding to the uplink resource allocation information.

7. An apparatus for handover to perform handover between beams by a terminal in a network environment in which a plurality of beams are provided within a base station, the apparatus comprising:
   a signal strength measuring processer for measuring signal strength of a serving beam and signal strength of a target beam;

a measurement report message transmission determining processer for generating a first measurement report message and transmitting it to the base station when the signal strength of the serving beam and the signal strength of the target beam satisfy a first condition or a second condition;

a handover command receiver for receiving a message commanding handover from the base station; and a handover performing processer for performing handover from the serving beam to a target beam corresponding to an identifier of a target beam included in the message commanding handover, wherein the first condition represents that the signal strength of the serving beam is greater than the signal strength of the target beam by a first offset, the second condition represents that the signal strength of the target beam is maintained greater than the signal strength of the serving beam by a second offset during a predetermined time, the measurement report message transmission processer generates and transmits a second measurement report message when the second condition is satisfied in a state in which inter-beam coordinated scheduling (IBCS) of transmitting/receiving data through a serving beam and a target beam is performed after transmitting a first measurement report message when the first condition is satisfied.

8. The apparatus of claim 7, further comprising a handover informing processer for transmitting a handover completion message to the base station through an uplink resource corresponding to the uplink resource allocation information included in the message commanding handover.

9. The apparatus of claim 8, wherein the handover informing processer transmits the handover completion message when the identifier of the target beam is provided from the handover performing processer.

* * * * *